J. F. D. WITHROW.
METHOD OF AND SECTIONAL CORE FOR MAKING CONCRETE PILING.
APPLICATION FILED JULY 26, 1905.
977,356. Patented Nov. 29, 1910.
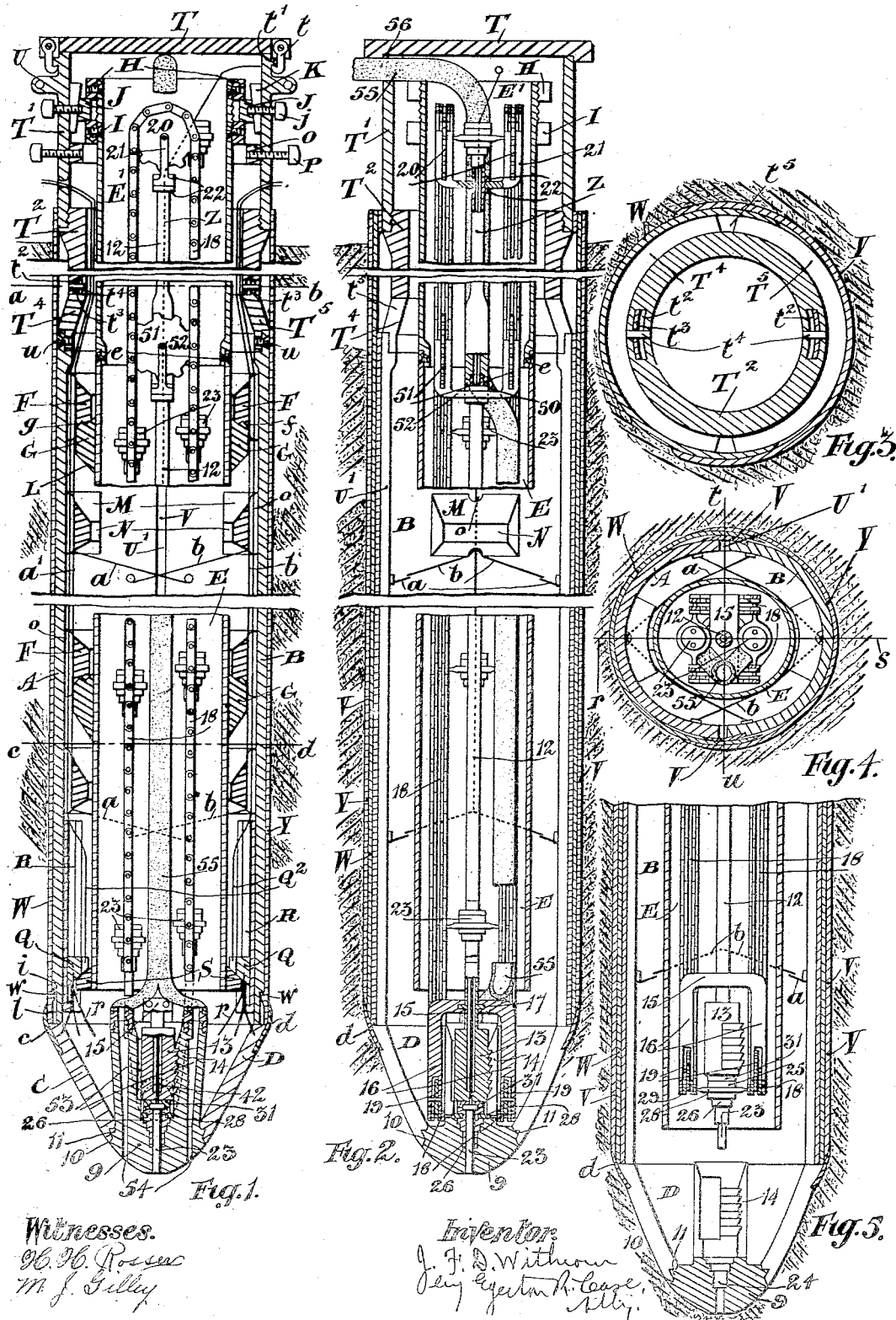

J. F. D. WITHROW.
METHOD OF AND SECTIONAL CORE FOR MAKING CONCRETE PILING.
APPLICATION FILED JULY 26, 1905.
977,356.
Patented Nov. 29, 1910.
5 SHEETS—SHEET 2.
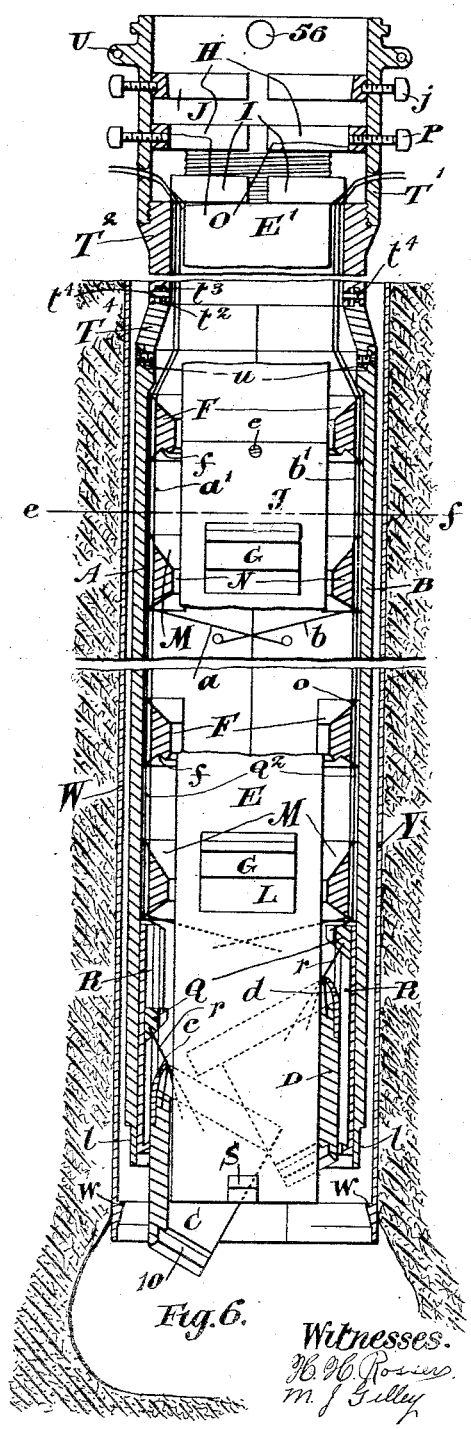
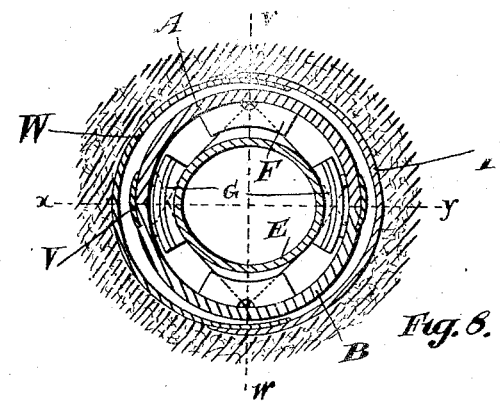
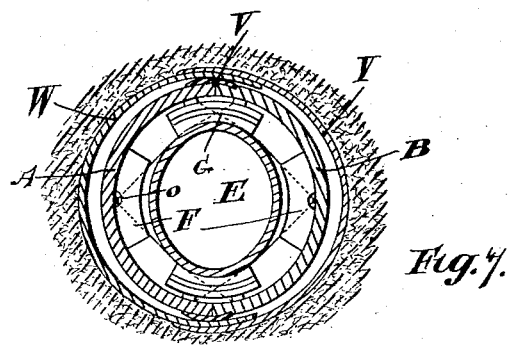
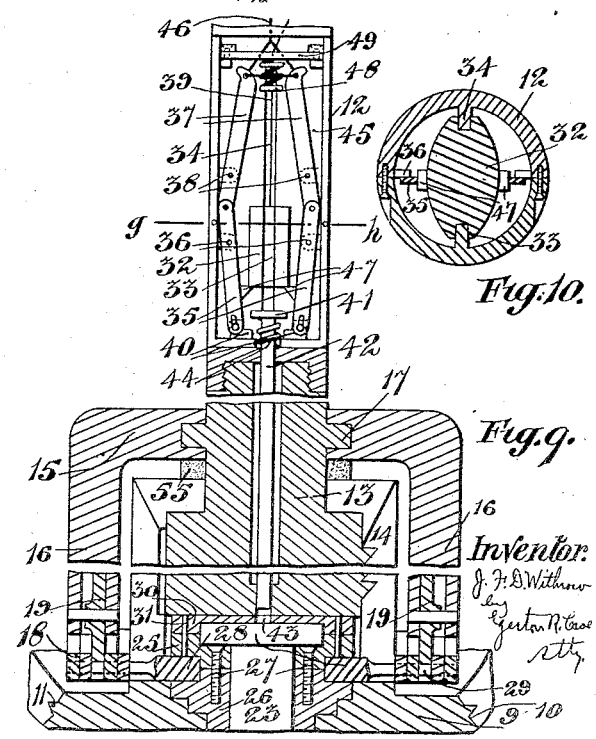

J. F. D. WITHROW.
METHOD OF AND SECTIONAL CORE FOR MAKING CONCRETE PILING.
APPLICATION FILED JULY 26, 1905.
977,356.
Patented Nov. 29, 1910.
5 SHEETS—SHEET 3.
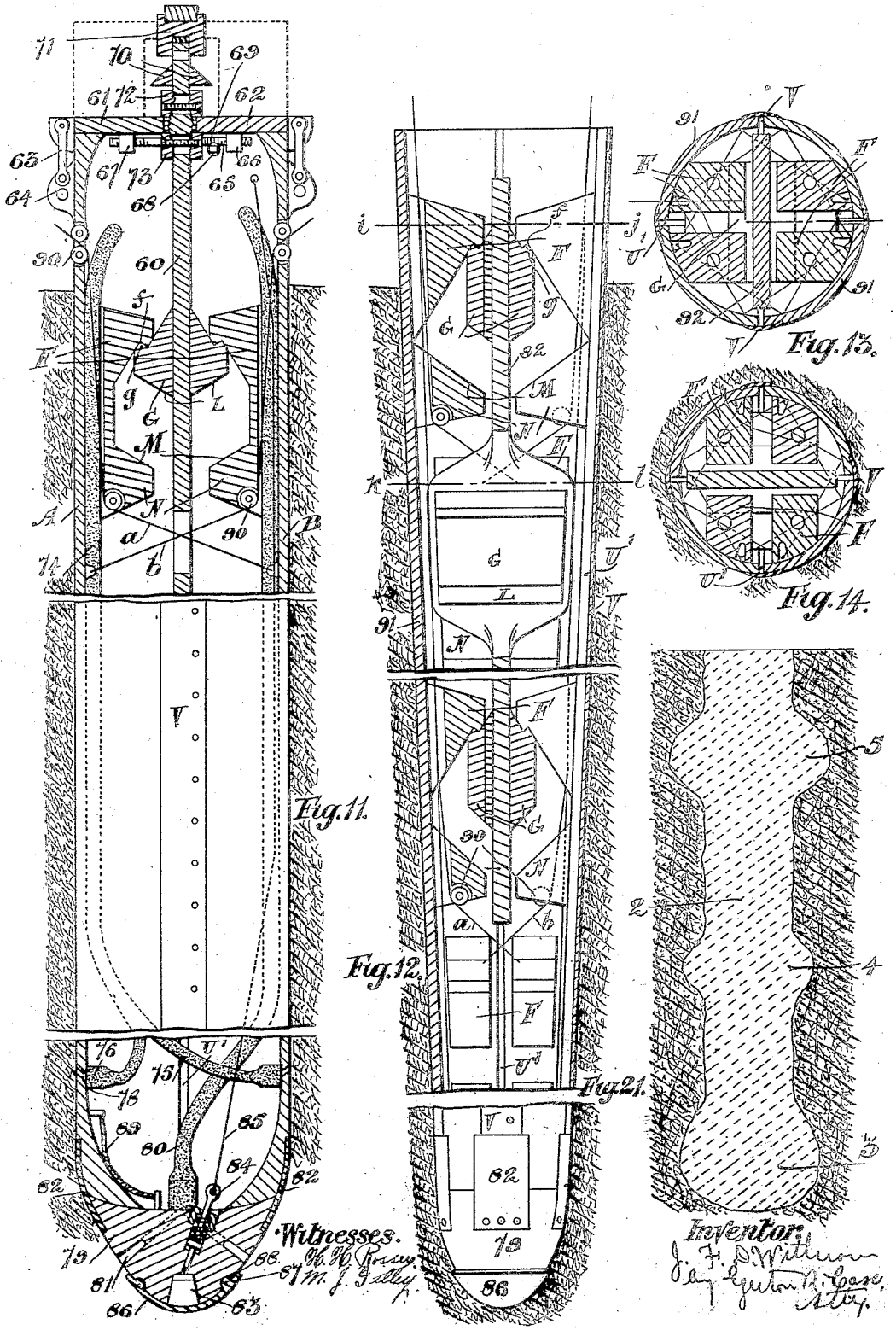

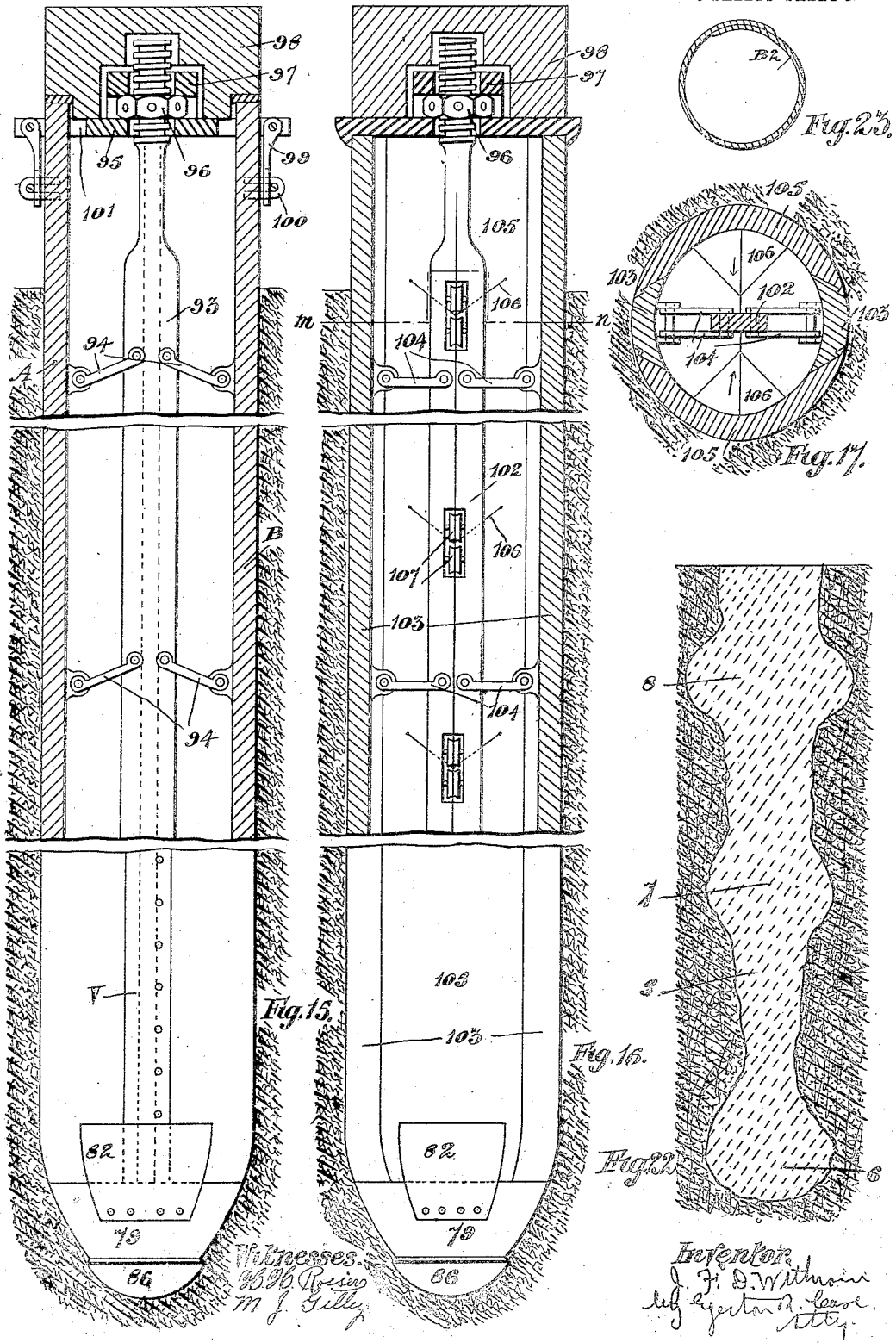

J. F. D. WITHROW.
METHOD OF AND SECTIONAL CORE FOR MAKING CONCRETE PILING.
APPLICATION FILED JULY 26, 1905.
977,356.
Patented Nov. 29, 1910.
5 SHEETS—SHEET 5.
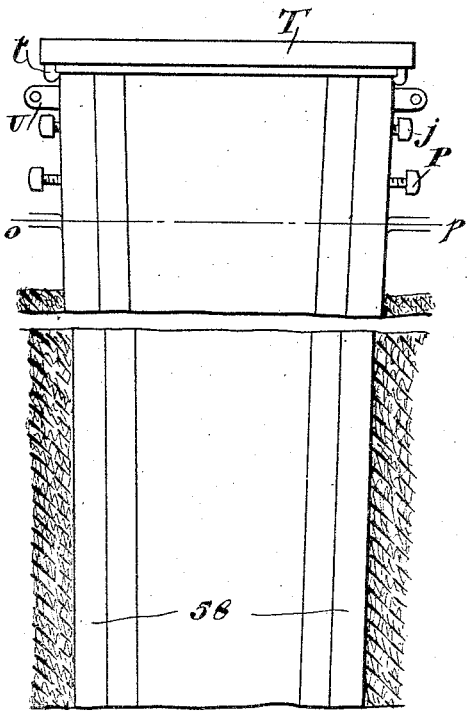
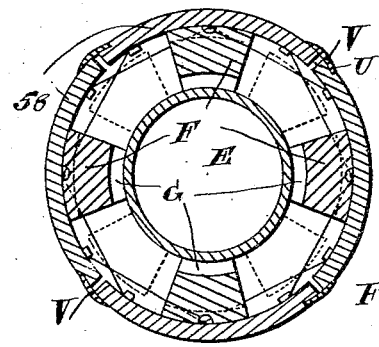
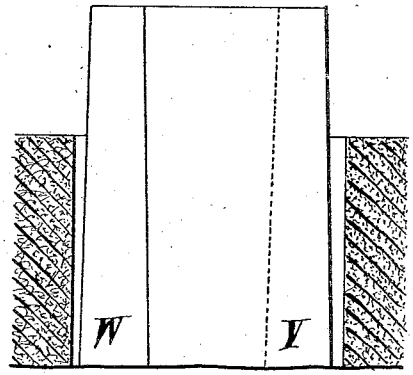
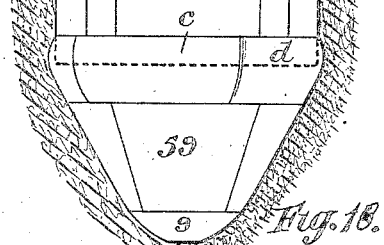
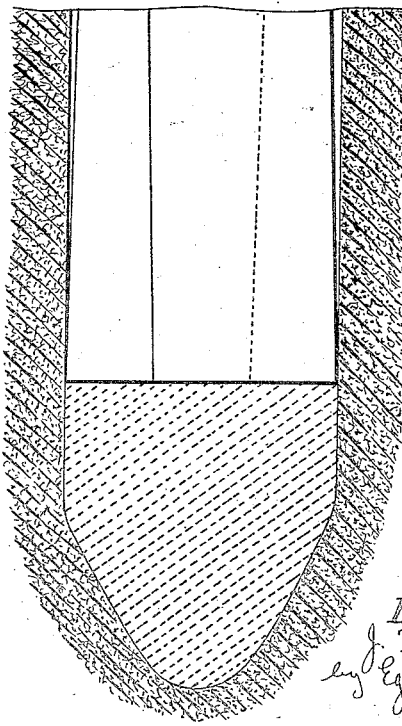

UNITED STATES PATENT OFFICE.

JOHN FREDERICK DOUGLAS WITHROW, OF TORONTO, ONTARIO, CANADA, ASSIGNOR TO RAYMOND CONCRETE PILE COMPANY, OF NEW YORK, N. Y., A CORPORATION OF NEW JERSEY.

METHOD OF AND SECTIONAL CORE FOR MAKING CONCRETE PILING.

977,356.  Specification of Letters Patent.  Patented Nov. 29, 1910.

Application filed July 26, 1905. Serial No. 271,289.

*To all whom it may concern:*

Be it known that I, JOHN FREDERICK DOUGLAS WITHROW, a subject of the King of Great Britain, residing in the city of Toronto, in the county of York, in the Province of Ontario, Canada, civil engineer, have invented certain new and useful Improvements in Methods of and Sectional Cores for Making Concrete Piling, of which the following is a specification.

My invention relates to improvements in methods of, and sectional core, for making concrete piling, and the objects of my invention are, firstly, to provide a collapsible core whereby concrete piling can be manufactured so that same may have firm support in stable and unstable ground; secondly, to laterally compress the ground after the core has been driven home; thirdly, to construct a core that can be collapsed and turned so that its sides will clear the hole formed thereby; fourthly to lubricate the exterior of the core to facilitate driving of same; fifthly, in unstable soils to prevent caving in of the hole made by the core; sixthly, to reduce to a minimum the resistance offered to the passage of the core through the different strata; seventhly, to provide means whereby the length of the core may be increased; eighthly, to provide a collapsible core that can be used without an outer envelop or sheathing; ninthly, to provide a collapsible and expansible core through which the concrete can be fed, and tenthly, to construct a collapsible core that can be adjusted to have either parallel or tapering sides, and it broadly consists of a core constructed of a plurality of longitudinal sections movable in or out; means for forcing or expanding the sections apart so as to increase the diameter of the core after same has been driven home and thus exert pressure against the walls of the hole formed thereby; means for contracting or moving inward said sections so as to decrease the diameter of the core, and a suitable point.

My preferred form of construction consists of a core composed of a plurality of longitudinal sections; a pipe held between said sections; means interposed between said pipe and the sections of said core whereby said sections are moved outward or expanded so as to increase the diameter of the core after same has been driven home and thus exert pressure against the walls of the hole; means for contracting or moving said sections together so as to decrease the diameter of the core so that same may be removable without forcible contact with the walls of the hole; the end constructed of a plurality of sections. With my core I will use an expansible and collapsible outer sheathing when working in unstable ground.

My invention may be employed in concrete piling either with parallel or tapering sides and circular or elliptical or other shape in cross-section and provided at its bottom with an enlarged foundation, and, if desired, provided at any point intermediate its top and bottom with enlargements whereby its friction against the soil is increased.

Figure 1 is a vertical central section through my preferred form of core. Fig. 2 is a vertical central-section through my core at right-angles to the section taken in Fig. 1. Fig. 3 is in part an enlarged cross-section on the line $a-b$, Fig. 1. Fig. 4 is a cross-section on the line $c-d$, Fig. 1. Fig. 5 is a vertical central-section through portion of my core taken in the same plane as is Fig. 2 with the firing-mechanism removed from the breech. Fig. 6 is, in part, a vertical central-section similar to that shown in Fig. 1, the core being collapsed. Fig. 7 is a cross-section on the line $e-f$, Fig. 6. Fig. 8 is a similar section to Fig. 7 except that the core has been turned ninety degrees. Fig. 9 is an enlarged vertical section through the firing-mechanism. Fig. 10 is a cross-section on the line $g-h$, Fig. 9. Figs 11 and 12 are, in part, vertical central-sections through alternative forms of my core. Fig. 13 is a cross-section on the line $i-j$, Fig. 12, and Fig. 14 is a cross-section on the line $k-l$, Fig. 12. Figs 15 and 16 are, in part, vertical central-sections through alternative forms of my core. Fig. 17 is a cross-section on the line $m-n$, Fig. 16. Fig. 18 is a side elevation of an alternative form of my core. Fig. 19 is a cross-section on the line $o-p$, Fig. 18. Fig 20 is a vertical section through the core-hole, showing the way my collapsible outer sheathing is used. Figs. 21 and 22 are vertical sections through different forms of piling manufactured with my core, and Fig. 23 is a cross-section through an alternative form of outer sheathing or envelop.

In the drawings like characters of reference indicate corresponding parts in each figure.

In the cores now on the market for manufacturing concrete piling, same cannot be expanded after they have been driven home so as to compress the walls of the hole. Neither are the cores constructed so as to be elliptical or oblong in cross-section, in which manner I prefer to manufacture mine, though not necessarily so. By manufacturing my core oblong in cross-section, I am enabled to give same a relatively greater clearance from the walls of the hole with the minimum collapsible movement of the core-sections. When the core is driven home, the greater diameter of same coincides with the greater diameter of the hole. In order to withdraw the core, the sections thereof are collapsed or drawn together, and the core turned ninety degrees so that what was the lesser diameter of the core as expanded coincides with the greater diameter of the hole, and the greater diameter of the core as expanded coincides with the lesser diameter of the hole, thus giving good clearance on all sides of the core from the walls of the hole. In my preferred form of invention, it is immaterial whether the same be circular, elliptical, or of other shape in cross-section when the core-sections are contracted. By making my core oblong in cross-section when expanded, I get greater clearance between the walls of the hole and the sides of the core, when said core is turned as before stated, with not more or even less movement of the core-sections than is now the case in cores now on the market, thus making my core stronger and stiffer.

Although some pile-cores on the market, are collapsible, they cannot be used without an outer envelop or sheathing. Now with my core, I can dispense with an outer envelop or sheathing in most cases: it will depend upon the nature of the soil whether or no an outer sheathing is used.

I prefer to manufacture my core so that sides of same will be parallel, but of course it will be understood that same may be manufactured so that the sides will taper. As far as I know, no collapsible cores are made with parallel sides. The support afforded by piling with parallel sides is much greater on a sub soil than that afforded by tapered piling. By means of my core I am enabled to manufacture piling either with tapering sides or parallel sides.

My core is made up of a plurality of longitudinal sections. According to my preferred form of construction, these sections are two in number and are called A and B. Held within the sections A and B is a pipe E which may be circular or elliptical in cross-section. In my preferred form of construction I prefer to make said pipe elliptical as shown clearly in Figs. 4, 7, and 8. My preferred form of core is represented in Fig. 1, after same has been driven into the ground. Upon inspection of same it will be seen that the sections A and B are expanded to the driving size, so it will be understood that these sections occupy the expanded position when the core is being driven home.

In order to expand the core-sections, and lock them in their expanded-positions I use suitable means for that purpose. According to the construction shown, I secure to or form a part of the said section blocks F with the under slanted ends of which coöperate similarly formed upper ends of blocks G secured to or forming part of the pipe E. In order that the sections A and B may be locked in the position shown in Fig. 1, I construct the abutting-surfaces of the blocks F and G in any suitable manner; according to the construction shown for this purpose the blocks F are provided with recesses $f$ in which fit shoulders $g$ formed in the blocks G thus providing suitable locking-means. In order to hold the blocks F and G in the relationship shown in Fig. 1, the pipe E must of course be held in constant position relative to the sections A and B: the pipe can be so held by suitable means hereinafter described. In order to further expand the sections A and B while the core is in the position shown in Fig. 1 for the purpose of further compressing the earth of the hole-wall prior to collapse and withdrawal, the locking-means for the pipe E is operated so as to permit of the downward movement of this pipe so that the lower slanted-surfaces L of the blocks G will come in contact with the upper slanted surfaces M of the blocks N secured to or forming part of said sections, thus forcing outward the sections A and B and compressing the walls of the hole. After the walls have been thus compressed, the pipe E is pulled upward so that the locking-means will be operated so that said pipe will be supported so that the blocks G of said pipe will be held in the space between the blocks F and N and thus permit the sections A and B to be contracted or drawn together by suitable means into the position shown in Fig. 7, (not necessarily revolving the pipe E) thus permitting the core to be turned within the hole formed thereby or, if desired, removed therefrom without turning. The means shown for contracting the sections A and B consist of a number of cords. The cords $a$ are secured to the sections B, and the cords $b$ are secured to the sections A. It will be understood that when the cords $a$ are pulled, the section B is moved inward, and that when the cords $b$ are pulled the section A is moved inward abutting the section B. These cords $a$ and $b$ are secured respectively to common cords $a^1$ and $b^1$ by means of which they are pulled.

In order to vary the pressure on the walls of the hole exerted by means of my core, it will be understood that it is merely necessary for me to change the angle of the abutting-surfaces of the blocks G and N. If it is found that the soil is unstable or softer below the surface, the blocks G and N can be constructed so as to exert greater pressure thereagainst the sides of the holes, than elsewhere.

My preferred form of construction for the point used in connection with my preferred form of core, consists of a plurality of sections, in the present instance two in number C and D. These sections are suitably constructed so as to be held in relation to the sections A and B. According to the construction shown for this purpose the sections are provided respectively with plates $c$ and $d$ secured to or forming part thereof, the upper ends of which clamp around the lower portion of said sections. These sections abut each other and of course permit of the expansion and contraction of the core. It will be noticed that the plates $c$ and $d$ are flush with the surface of the sections C and D, thus preventing said sections from meeting with undue resistance. In order that the sections C and D may be withdrawn with the core, same may be suitably connected thereto. According to the construction shown, I provide blocks Q sliding in upright-guides R secured to or forming part of said sections. The blocks Q are connected to the sections C and D by flexible connections $r$. By means of blocks S secured to or forming part of the pipe E and on the outside thereof at its lower end and provided with slanting upper-surfaces coöperating with a similarly constructed surface formed on the under side of the blocks Q, the flexible-connections $r$ are kept taut, thus holding the sections C and D in place.

One great object of my invention is to feed the concrete down through the pipe E, and in order to do so I unlock said pipe from the sections of the core and turn it into position shown in Figs. 6, 7 and 8 so that it may be lowered until its point is preferably below the lower end of the sections A and B. The turning of the pipe E into the position shown in Figs. 6, 7 and 8 moves the blocks G and S of said pipe so that they will not abut against the blocks F, Q, and N when the pipe E is moved down. In order to move the sections C and D as much as possible out of the path of movement of the cement and thus keep them clean, I attach to the blocks Q cords $Q^2$. Before the sections C and D can be drawn up between the pipe E and the sections A and B, as shown in Fig. 6, same must be lowered until the tops of their plates $c$ and $d$ escape the lower end of the sections A and B, as will be clearly understood; the pipe E of course having been previously turned: then the cords $Q^2$ are pulled thus pulling upward the blocks Q and the sections C and D. In Fig. 6, the enlarged bottom cavity produced as by a torpedo explosion, permits the lowering of sections C and D; and the same result can be effected by driving sections C and D slightly, but not part W, as by the core collapsed; or by first slightly raising the entire apparatus, and then lowering sections C and D. The turning of the pipe E moves the blocks S out of the path of movement of the blocks Q, thus permitting said blocks Q to drop downward providing the necessary movement for the sections C and D in order that their plates may escape the sections A and B.

$b$ are holes in the series of blocks secured to or forming part of the sections A and B through which the cords $a^1$, $b^1$, and $Q^2$ pass.

In Figs. 1, 2 and 6 I have shown what I term a follower secured to the sections A and B and by means of which the core is capable of being driven farther into the earth than if same were not used. The follower is constructed of an intermediate member $T^2$ made of one piece and preferably circular in cross-section, as shown in Fig. 3, and a lower member. This lower member is constructed of two sections $T^4$ and $T^5$ which are suitably secured respectively to the sections A and B as by screws $u$. From this description it will be understood that the lower member will permit of the necessary movement of the sections of the core. In order to attach the sections $T^4$ and $T^5$ the lower edge of the member $T^2$ is provided with recesses $t^2$ in which operate the lugs $t^3$ secured to or forming part of the sections $T^4$ and $T^5$. $t^4$ are pins held in the member $T^2$ and passing through the lugs $t^3$ thus coupling the sections $T^4$ and $T^5$ to the member $T^2$. The sections $T^4$ and $T^5$ are separated by slots $t^5$, as shown in Fig. 3. It will be understood from the description just given that when the sections A and B are expanded or contracted the sections $T^4$ and $T^5$ will also be expanded or contracted. $T^1$ is the upper member of the follower made of one piece and preferably circular in cross-section, and same is screwed over the top of the intermediate member $T^2$. T is any suitable top or cover for the upper member $T^1$, and a suitable buffer-block (not shown) will be used therewith. By means of the hooks $t$ pivoted thereto engaging with the lugs $t^1$ secured to or forming part of said upper member, the cover or top T is secured to the core. U are any suitable lugs secured to or forming part of the member $T^1$ by means of which the core is handled.

When I use the follower before described and consequently lengthen the core, I must also lengthen the pipe E and do so by adding the extension $E^1$ thereto, the parts being secured together by any suitable means such as screws $c$. The locking-means for the pipe E and its extension $E^1$ are preferably constructed as follows: H and I are segments secured to or forming part of the extension $E^1$ and on the outside thereof. Coöperating with the segments H are segments J supported, as stated below, in part $T^1$, upon which the segments H rest, thus preventing the downward movement of the pipe E and extension. The segments J are adjustable in and out so as to be moved under and from under the segments H, and are operated by screws $j$ operating in the top member $T^1$. If desired, I may interpose removable wedges K between the top member $T^1$ and the segments J so as to positively lock the segments in position relative to the segments H. It will be noticed that the segments I abut against the under side of the segments J thus preventing the rebounding of the pipe E when the core is struck: thus locking the pipe E also prevents the rebounding force from injuring the blocks F and G. When the pipe E and its extension $E^1$ have been moved so that the blocks G are out of engagement with the blocks F and N, the segments O are moved between the segments H and I thus securely locking these parts in position. By means of the screws P, the segments O are attached to the upper member $T^1$ of the follower.

Of course it will be understood that I may dispense with the follower composed of the parts $T^1$, $T^2$, and $T^4$, and $T^5$ and will also dispense with the extension $E^1$ when I dispense with the follower. The core without the follower will of course be provided with any suitable top, such as T, suitably secured thereto, and the pipe E will be provided with any suitable locking-means such as those before described. It will be noticed that the locking-means before described for the pipe E are detachable, and it is my intention to remove the locking-means from the upper member of the follower and the extension $E^1$ and attach same to the sections A and B and the upper end of the pipe E.

It will of course be understood that by reason of the construction of the core of a number of movable sections that there is of necessity a space between said sections when same are not contracted, as shown at $U^1$ (Figs. 1 and 4). In order to prevent the earth or other material from entering the core through these spaces, I secure to or form part of either of the sections A and B (in the present instance shown as secured to the section B) plates V which completely overlap said openings. It will of course be understood that the plates V have sliding movement against the section A. As far as I know, no collapsible cores on the market can be used without a complete outer sheathing or envelop so as to prevent the entry of earth and other material into the core through the openings between the sections. Now by means of my plates V, (which of course extend for the whole length of the spaces $U^1$), I am enabled to dispense with the use of an outer sheathing or envelop in connection with a contractible and expansible core. When working in unstable soil, the walls of the hole will cave in more or less when the core is contracted prior to being withdrawn. In order to prevent this, I suitably attach to the core-sections, an outer sheathing which is designed to be left in the hole formed by the core so as to permit the core to be withdrawn without any danger of the walls of the hole caving in. This sheathing is constructed of a plurality of sections and will consequently offer no resistance to the expansion of the core. In the present instance I show the sheathing as constructed of two sections, W and Y. The sheathing is placed around the core before same is driven into the earth, and in order to hold the sections W and Y in place during driving of the core, I provide same near their lower ends and on their inner sides with lugs $w$, which abut against shoulders $i$ formed in the sections A and B by the cutting away of a suitable distance on the outer surface of the sections A and B at their lower ends as shown at $i$, so as to provide a free path for the lugs $w$, so that the sections W and Y may be placed in position. When the sheathing is used, it will be understood that the plates $c$ and $d$ will be placed outside of same, as shown in Fig. 1.

Upon referring to Fig. 20, it will be seen that the core has been removed from the sheathing and that the latter is being withdrawn from the hole while the cement is fed therethrough to fill same. The sheathing need not be contracted as shown in Fig. 20, and in fact could not be so contracted when working in unstable soil if it is desired to make piling with parallel sides. As the sheathing will be made of material, preferably sheet metal, which is comparatively inexpensive, it will be understood that same may be left down in the hole permanently if desired. When a sheathing is left in a hole, it will be understood that the piling has not as much friction against the walls of same as it has against the earthen walls of a hole, because it can enter and fill all the interstices in said earthen wall and thus afford better support for the structure to be built thereon. When the sheathing is used permanently, the whole weight of the structure will be borne or supported by the ends of the piling and not in as great a degree by the sides of the piling as when a sheathing is dispensed with, because of the reasons before stated.

If I do not wish to use torpedoes or cartridges, I can attach to the chains 18 metal plugs of the same size and shape as said torpedoes or cartridges so as to effectually prevent any entrance of dirt or other material into the core through the head 9.

In my preferred form of construction, I also combine with the core, means whereby water is ejected from the core so as to lubricate same. The construction shown for this purpose consists of two ducts 53 formed in the same casting as the breech-lock and which communicate with holes 54 in the head 9, and which open therefrom. Coupled over the ends of the ducts 53 are the branches of a hose 55 which enters the core preferably through a hole 56 near the top thereof. It will be noticed that the hose 55 is run up within the pipe E and through the extension $E^1$ when same is used. Of course before the cement is fed down through the pipe E, it will be understood that the head 9; the hose 55; the rod or pipe 12, and the sprocket-chains 18 are removed from said pipe by being pulled upward. Now by making my preferred form of core elliptical or oblong in cross-section when expanded, I am enabled to get considerable clearance between the walls of the hole and the sides of the core when said core is contracted and turned ninety degrees. The line $r$—$s$, Fig. 4 represents the greater diameter of the core when expanded, and the line $t$—$u$, represents the lesser diameter of same when expanded; these diameters of course coincide respectively with the greater and lesser diameters of the hole. When the core is contracted and turned ninety degrees what was the greater diameter of the core as expanded is represented by the dotted line $v$—$w$, in Fig. 8 which coincides with the lesser diameter of the hole, and what was the lesser diameter of the core as expanded, is represented by the dotted line $x$—$y$, in same figure, which coincides with the greater diameter of the hole. This position of the core gives me plenty of clearance between same and the walls of the hole.

In Fig. 18, I show a side elevation of an alternative form of my core as shown in Figs. 1 and 2. The internal mechanism of the core is the same except that the core is composed of four sections, 58, and is circular in cross-section when expanded and contracted. The spaces of course between the sections are overlapped by the plates V. By increasing the number of sections, I of course must increase the number of blocks used on the sections, and on the pipe E for expanding the core and locking it. The sides of the core shown in Fig. 18 are tapered. Of course the end of the core will be made of a corresponding number of sections 59 provided with the plates $c$ and $d$.

In Fig. 11 I show a modified form of my core. Through this core it is not possible to feed the cement. The sections A and B of this core are provided with the blocks before mentioned, and in place of the pipe E I use a rod or plate 60 provided with blocks G. The operation of the blocks in this modified form is the same as that before described. The top of this core is composed of two members 61 and 62 which are secured by links 63 to the ears 64 secured to or forming part of the sections A and B. By means of the rod 65 threaded in opposite directions thereto lugs 66 and 67 secured to or forming part of the members 62 and 61, said members are moved to or from each other by the operation of the worm-provided rod 68, the worm of which meshes with the worm 69 on the rod 65. The rod 68 extends through the section B and is operated by placing a key (not shown) on its squared end so that it may be turned to separate or close the members 61 and 62. I separate the members 61 and 62 so that the parts on the plate 60 above said members may be passed into the core so that the blocks G may be moved out of engagement with the blocks F and N to collapse the core, or so that they may be moved into engagement with the blocks N in order to expand the core and compress the walls of the hole. When the plate 60 is moved so that the core may be collapsed, the projections 70 secured thereto or forming part thereof rest upon the members 61 and 62 and prevent further movement of said plate. By means of any suitable buffer-head 71 on the top of the plate 60, said plate may be moved down. By means of the pairs of plates 72 and 73 adjustably secured to the plate 60 above and below, respectively, the members 61 and 62, the plate 60 is locked in position and prevented from up and down movement.

In order to lubricate the sides of the core, I provide a hose 74 and provide same with branches 75 which are secured over couplings 76 so that water may be forced out of the holes 78 in the sections A and B. It will be noticed that the holes 78 are pointed upward so that there will be no danger of dirt packing therein when the core is being driven home. In this form of core I provide a solid head 79 and by means of a hose 80 coupled thereto, force water through holes 81 of said head which further lubricates the core. The head 79 is provided with plates 82 which fit or clamp around the sections A and B and thus maintain said head in place. It will be seen that the plates 82 are flush with the head for the purpose of reducing resistance. In the end of the head 79 I form one or more recesses in which may be placed cartridges or torpedoes 83. By means of any suitable spring-controlled needle 84 operated by the wire or rod 85 the cartridges or torpedoes are exploded. In order to prevent dirt from getting in the recesses for the cartridges, I place a metallic plate 86 over the end of said head, and provide same with shoulders 87 which fit in correspondingly-shaped slots 88 in said head so that said plate may be held in position. This core is elliptical in cross-section and has parallel sides. When it is collapsed and withdrawn, the head 79 is pulled up with the core by reason of a connection 89 securing same thereto. This form of core is also contracted by the means before described. In order to prevent the cords $a$ and $b$ from rubbing against any part of the core, I provide pulleys 90 at the points where friction would likely occur.

In Figs. 12, 13, and 14, I show a further alternative form of my core. This core is circular in cross-section and provided with tapering sides. The head of same is constructed similarly to the head of the core shown in Fig. 11. The core is made up of a plurality of sections 91, the spaces between which are bridged by the plates V. Similar means are used in this core for contracting and expanding the core-sections as have already been described, except that the plate 92 is provided with the blocks G placed at right-angles to each other in alternate sets which also necessitates the placing of the blocks F and N coöperating therewith also at right-angles to the sets of similar blocks immediately above and below. Of course in connection with the alternative form described in Figs. 11 and 12, I may use the collapsible sheathing or envelop before described.

In Fig. 15, I show a still further alternative form of core: this is elliptical in cross-section, and made of two sections with parallel sides. In place of the expanding and contracting-means described in connection with the other forms I use a central bar 93 to which are pivoted links or arms 94 which are pivoted at their lower ends to the sections A and B. The position of the sections A and B of this core is that of the sections in Fig. 1, and the bar and its connected parts are locked in position by the following means: the threaded upper end of the bar 93 passes through the top 95 of this core, and threaded thereon is a nut 96. The top 95 is provided with a bail 97 through which the threaded end of the bar passes. These parts effectually lock the bar 93 and sections A and B firmly in place. When it is desired to expand the core, the buffer-head 98 is removed and the nut 96 turned thus forcing downward the bar 93 causing the links 94 to assume a horizontal position and expand the core. 99 are links pivoted to the top 95. These links 99 slip over staples 100 secured to or forming part of the sections A and B and are suitably secured in place. The top is recessed at 101, thus providing sufficient room for expansion and contraction of the sections. After disconnecting the links 99 from the staples 100 and pulling the top 95 upward, the bar 93 is drawn up contracting the core so that same may be withdrawn from the ground.

In the alternative form shown in Fig. 16, the rod 102 is connected to two vertical sections 103 by links 104. This core is preferably elliptical in cross-section and has parallel sides. It cannot be expanded after being driven home. After the core has been driven home, the rod or bar 102 is pulled upward by any suitable means, such as that shown and described in Fig. 15, thus pulling the sections 103 inward and allowing the sections 105 to be drawn inward so as to collapse the core. By means of the cords 106 applying a force in the directions indicated by arrows, the said sections 105 are collapsed. In order to reduce friction, the cords are passed over pulleys 107 having bearing in the bar or rod 102. The abutting-surfaces of the sections 103 and 105 are preferably constructed dove-tailed so as to make a stiff and strong core.

It will be noticed that I positively contract my core and do not depend upon the external pressure exerted against the sections for this purpose. As far as I am aware the expansible cores now on the market are contracted because of the external pressure exerted against the section when the expanding-means is pulled upward and the core still in the ground. By thus positively contracting the sections of the core I get a good clearance between same and the walls of the hole, or the sheathing used.

Upon referring to Fig. 21, will be seen a cross-section through an alternative form of outer sheathing or envelop that can be used in connection with my core. This sheathing or envelop comprises one sheet of suitable material $B^2$, made preferably of sheet metal and having its ends overlapped as shown, thus providing the necessary condition to allow for the expansion of the core; from this it will be seen that it is not absolutely essential to make the outer sheathing or envelop of a plurality of parts.

By means of my core I can construct piling either with parallel or tapering sides; in order to do this, the sets of blocks G used will have to be constructed accordingly. For instance, if I desire to form a hole with tapering sides, I can remove the blocks G shown in Fig. 1, and insert in place thereof similar blocks of differing dimensions, so as to cause the upper portion of the core to be expanded so as to make its sides tapering.

By following out my method of manufacturing piling, it is not absolutely essential that the core be expanded after it is driven into the earth.

Of course it will be understood that the point 79 is merely a modification and a solidification of point 9 and the sections C and D. This point is of course made of one piece and I discard the breech and associated parts when using same. The plates 82 are merely modifications of the plates c and d.

I do not confine myself to the construction herein shown and described, as same can be changed in various way without departing from the spirit of my invention.

One of my objects in providing a core which may be expanded after driving and thus pressed tight against the walls of the hole, is to obtain increased resistance to the upward reaction of the explosive on discharge of same. An ordinary tapering pile, or one having parallel sides but having only an enlarged point touching the walls of the hole would not have as much resistance to the upward reaction of an explosive as my pile, having either parallel or tapering sides, which are laterally pressed tight against the walls of the hole. Thus much of the upward reaction of an explosive is communicated to the surrounding earth and tends to expand the pile still further. At the instant an explosion is desired, the pile may be struck on the driving head with the pile driving hammer.

In Figs. 7 and 8 is clearly shown the action of the plate V when the pile is collapsed. The plate V is made of metal having a tendency to curl or bend inward transversely of the pile and longitudinally of the plate. Thus when the pile is collapsed, the free end of the plate V holds tight against the outer longitudinal side section upon which it rides thereby preventing dirt entering the pile.

What I claim as my invention is:—

1. A temporary pile comprising a plurality of movable sections, a means holding said sections in a driving position, and a means adapted to move said sections apart, after the pile is driven, beyond the driving position.

2. A core for making piling composed of composite material, comprising a plurality of sections movable in relation to each other, and a means performing the dual function of holding the said sections in a fixed position while the core is being driven into the ground, and when the core is driven, expanding it by moving said sections out or apart beyond the driving position.

3. The combination in a temporary pile, of a plurality of movable sections provided with projections constructed with a lower interlocking surface, of a member between said sections and provided with blocks, the upper surfaces of which blocks are constructed to coact with the interlocking surfaces of said projections, so as to hold said sections in a driving position.

4. The combination in a temporary pile, of a plurality of movable sections provided with projections having a downward-inward-sloping upper surface, of a member between said sections and having blocks with their lower surfaces constructed with an upward-outward-slanting surface so as to coact with the downward-inward-sloping surfaces on the projections on said sections, said inner member and outer member being so adapted that when the inner member is movable downward, relatively to the other sections and beyond its position when the pile is adjusted for driving, the outer sections will be forced apart.

5. In a core or pile, the combination with a plurality of sections movable in relation to each other, each section provided with an upper block constructed with a lower interlocking edge, and a lower block constructed with a downward-inward-sloping upper surface; of a member surrounded by said sections and provided with a block the upper edge of which is constructed to coact with the lower interlocking edge of said first mentioned block so as to lock said sections in position; said lower interlocking edge being constructed with an upper outward slanting surface so as to coact with the downward-inward-slanting surface of said second mentioned block, so that as said member is moved downward the sections will be forced apart.

6. A core for making concrete piling, which comprises a plurality of longitudinal sections movable in relation to each other, a hollow member open at each end and through which communication is provided, blocks secured to said sections, blocks secured to said hollow member and on the outside thereof, and adapted to abut against the blocks secured to said sections, the abutting surfaces of said blocks being constructed so that they will interlock, thus locking said sections in an expanded position, and means whereby said hollow member is locked so as to prevent movement of same.

7. A pile or core for making piling composed of composite material, comprising a plurality of sections movable in relation to each other, longitudinal plates secured at one end to either of said sections and bridging the openings or spaces therebetween so that the free ends will ride on the outside of the section with which they are in contact, and means for expanding said core, by moving said sections out or apart, after it has been driven into the ground.

8. A core for making piling composed of composite material, comprising a plurality of longitudinal sections movable in relation to each other, a hollow member inclosed by said sections, a means, interposed between said hollow member and said sections, performing the dual function of holding the said sections in a fixed position while the core is being driven into the ground, and, when operated, expanding the core by moving said sections out or apart so as to compress the sides of the hole made by said core, means for moving inward or together said sections so as to decrease the diameter of the core; longitudinal plates bridging the space between said sections and on the outside thereof, and a point for said core composed of a plurality of movable sections.

9. A core for making concrete piling, comprising a plurality of longitudinal sections movable in relation to each other, a means performing the dual function of holding the said sections in a fixed position while the core is being driven into the ground, and, when the core is driven, expanding it by moving said sections out or apart so as to compress the sides of the hole made by said core; and a plurality of longitudinal plates secured at one end or side to either of said sections and bridging the openings or spaces therebetween so that the free ends thereof will ride on the outside of the section in contact therewith.

10. A core for making piling composed of composite material, comprising a plurality of sections movable in relation to each other, and means for expanding said core, after it has been driven into the ground, by moving said sections out or apart.

11. A core for making piling composed of composite material, comprising a plurality of longitudinal sections movable in relation to each other, and means for expanding said core, after it has been driven into the ground, by moving said sections out or apart.

12. A core for making piling composed of composite material, comprising a plurality of longitudinal sections movable in relation to each other, and a longitudinal movable means for expanding said core, after it has been driven into the ground, by moving said sections out or apart.

13. An hollow core for making piling composed of composite material, comprising a plurality of sections movable in relation to each other, a pipe surrounded by said members and adapted to permit the passage through itself of said composite material, and means intermediate said pipe and said sections and operated by the longitudinal movement of said pipe so as to expand said core, after it has been driven into the ground, by moving said sections out or apart.

14. An expansible and collapsible temporary pile comprising in combination a plurality of outer sections, projections on said outer sections, an inner member movable up and down, locking blocks on said member engaging the projections on the outer sections from underneath, and means for holding the inner member up, thus holding said projections and locking blocks in an engaged position, and holding said outer sections in an expanded position.

15. In an expansible and collapsible temporary pile, a plurality of outer sections, an inner member movable up and down, means so adapted that when said inner member is held up, said temporary pile is held in an expanded position, and means whereby when said member is lowered said pile may be collapsed.

16. In an expansible and collapsible temporary pile, a plurality of outer sections, an inner member movable up and down, means so adapted that when said inner member is held up, said temporary pile is held in an expanded position, means whereby when said inner member is lowered said pile may be collapsed, and means whereby when said inner section is forced farther down said pile may be further expanded.

17. The combination in a temporary pile or core, of a plurality of longitudinal core sections having projections constructed with lower interlocking surfaces, an inner member movable up and down between said core-sections and provided with blocks having upper surfaces constructed to interlock with the surfaces of said projections on the core sections, means holding said inner member up and said blocks and projections interlocked, a detachable point, means for holding the inner member down and the blocks thereon disengaged from the projections on the core sections, means for collapsing said core comprising ropes attached to each core section, crossed to another core section and leading to the top of the pile whereby when said ropes are pulled said pile will be collapsed.

18. In a temporary pile, the combination with a plurality of outer sections, of an inner member movable up and down and adapted when held up to hold the outer sections in a driving position, means for holding said member up comprising transversely movable plates coacting with attachments on said inner member, and means for moving said plates.

19. In an expansible temporary pile or core, the combination with a plurality of outer core sections, of an inner member movable longitudinally, means for holding said core sections and inner member in a driving position, and inclined coacting surfaces on said core-sections and said inner member so adapted that when said inner member is movable longitudinally said outer core sections will be expanded beyond their driving position.

20. The combination with a core or pile composed of a plurality of sections movable in relation to each other, of a transversely yielding sheathing or envelop surrounding said core or pile.

21. The combination with a core or pile composed of a plurality of longitudinal sections movable in relation to each other, of a transversely yielding sheathing or envelop surrounding said core or pile.

22. The combination with a core or pile composed of a plurality of longitudinal sections movable in relation to each other, of a transversely yielding bottomless sheathing or envelop surrounding said core or pile.

23. A sheathing or envelop for the purpose specified, composed of a plurality of longitudinal sections whereby it can be expanded or contracted, thus increasing or diminishing its transverse diameter.

24. The combination with a core for making concrete piling, said core being composed of a plurality of longitudinal sections movable in relation to each other, of means for moving said sections, and a transversely yielding sheathing or envelop embracing said core and consisting of a plurality of longitudinal members overlapping at their edges.

25. A transversely expansible sheathing or envelop comprising a plurality of members overlapping at their edges.

26. A hollow expansible and collapsible preparatory pile having a hollow portion from top to bottom adapted to permit the passage of the fluid material for the permanent pile to the bottom of the hole.

27. A hollow expansible and collapsible preparatory pile adapted to permit the feed through itself of composite pile-material, and constructed elliptical or oblong in cross section.

28. A hollow preparatory pile composed of a plurality of sections movable in relation to each other, and elliptical or oblong in cross section and adapted to permit the feed through itself of composite pile-material.

29. A core or pile comprising an outer collapsible member provided with a suitable point constructed of a plurality of removable sections, and an inner hollow member having free passage through it for composite pile-material, said inner member being surrounded by said outer member, and longitudinally movable in relation thereto.

30. A core or pile comprising an outer collapsible member, an inner hollow member having free passage for composite pile-material, said outer member being provided with a point constructed of a plurality of removable sections adapted to be drawn up between said outer member and the inner hollow member, said inner hollow member being surrounded by said outer member, and axially movable in relation thereto.

31. A core or pile comprising an outer collapsible member composed of a plurality of longitudinal members movable in relation to each other, an inner hollow member having free passage for composite pile-material, a point constructed of a plurality of removable sections adapted to be drawn up between said outer member and said inner hollow member, said inner hollow member being surrounded by said outer member and longitudinally and axially movable in relation thereto.

32. In an expansible and collapsible temporary pile, means operable for expanding said pile laterally after it has been driven into the ground.

33. A core for making piling composed of composite material, comprising a plurality of sections movable in relation to each other, and a means for expanding said core after same has been driven into the ground by moving said sections out or apart so as to compress the sides of the hole made by said core in the ground; said core being provided with a suitable point.

34. A hollow core for making piling composed of composite material, comprising a plurality of sections movable in relation to each other, a pipe surrounded by said members, providing free passage for the composite pile-material, and a means intermediate said pipe and said sections and operated by the downward longitudinal movement of said pipe after the core has been driven into the ground, to press said sections against the sides of the hole made by said core in the ground.

35. A core for making concrete piling, composed of a plurality of longitudinal sections movable in or out, and means operating between said sections and constructed to force said sections apart giving greater movement to said core-sections at any point or points in order to expand the core at such point or points and thus give the core a greater diameter there than elsewhere.

36. A core for making concrete piling, composed of a plurality of longitudinal sections movable in or out, and flexible means operating independently of core-driving means and attached to said core sections, whereby said sections are pulled together so as to reduce the diameter of the core.

37. A preparatory pile for making concrete piling, which comprises a hollow core consisting of a plurality of longitudinal sections movable in relation to each other, means surrounded by said core sections for moving them, and flexible means attached to said core sections and operating independently of said moving means, whereby said sections are pulled together so as to reduce the diameter of the core.

38. In an expansible and collapsible preparatory pile, the combination with a plurality of outer sections, of an inner expanding member, and flexible means attached to the outer sections and unattached to the inner member, for collapsing said pile.

39. A preparatory pile-core, which comprises a plurality of sections movable in relation to each other, of flexible means attached to said sections and operable to contract the core.

40. In an expansible and collapsible temporary pile composed of a plurality of outer sections and an inner expanding section, the combination with flexible means for collapsing said pile comprising ropes attached to each outer section, crossed to the opposite section and leading through suitable guideways to the upper end of the pile, whereby when said ropes are pulled the pile will be collapsed.

41. The combination in an expansible and collapsible temporary pile, of a plurality of outer movable sections, and an inner member adapted on being rotated axially to permit the retraction of said outer sections.

42. The combination with a core constructed of a plurality of sections movable in relation to each other, of a member surrounded by said sections and capable of longitudinal and axial movement so as to permit the expansion and contraction of said core, and the raising and lowering of said surrounded member.

43. The combination in a temporary pile, with a plurality of sections movable in relation to each other, of a member surrounded by said sections and capable of longitudinal and axial movement, coacting blocks on said sections and member to hold same apart, said member being turned so that the blocks adapted to hold apart said sections and said member clear each other, allowing said member to be raised or lowered.

44. The combination with a core constructed of a plurality of sections movable in relation to each other, and so placed that when moved out or apart they give the core an elliptical or oblong shape in cross section, of a member surrounded by said sections, capable of longitudinal and axial movement and elliptical or oblong in cross section, its longer transverse diameter being adapted to coincide with the longer transverse diameter of said core when same is expanded, said member being capable of being turned so that its longer diameter will coincide with the shorter diameter of said core when contracted, so as to provide for the contraction of said core.

45. The combination in an expansible and collapsible temporary pile, with a core composed of a plurality of movable sections, of an inner member oblong in cross section surrounded by said outer sections, the longer diameter of said inner member coinciding with one diameter of the pile holding the outer sections apart and thus the pile expanded, the inner oblong member being adapted to be turned so that the core may be collapsed.

46. In the art of molding concrete piles in the earth, the method of giving plenty of clearance between the sides of the preparatory pile and the walls of the hole made thereby, which consists in driving an expansible and contractible preparatory pile-core, oblong in cross section when expanded, into the ground, in an expanded position; then contracting the core and turning it partially until what was its greater diameter as expanded coincides with the lesser diameter of the hole and is less than said lesser diameter, and what was the lesser diameter of the core as expanded coincides with the greater diameter of the hole and is less than said lesser diameter, thus providing the required clearance.

47. In the art of molding concrete piles in the earth, the method of giving plenty of clearance between the sides of a preparatory pile and the walls of the hole made thereby, which consists in driving an expansible and contractible preparatory pile-core, oblong in cross section when expanded, into the ground in an expanded position; then further expanding said core so as to compress the walls of the hole; then contracting the core and turning it partially until what was the greater diameter of the core as expanded coincides with the lesser diameter of the hole and is less than said lesser diameter, and what was the lesser diameter of the core as expanded coincides with the greater diameter of the hole and is less than said lesser diameter, thus providing the required clearance.

48. In the art of molding concrete piles in the earth, the method of making the earth-mold, which consists in driving into the ground a collapsible core oblong in cross section, then contracting same and partly revolving it so that what was the greater diameter of the core as expanded coincides with the lesser diameter of the hole, and what was the lesser diameter of the core as expanded coincides with the greater diameter of the hole, and then withdrawing the core from the hole.

49. In the art of molding concrete piles in the earth, the method of preparing the earth-mold, which consists in driving a preparatory pile-core oblong in cross section when expanded and provided with a transversely yielding sheathing or envelop, into the ground, in an expanded position; then further expanding said core, then contracting said core and turning it partly until what was the greater diameter of the core as expanded coincides with the lesser transverse diameter of said sheathing and is less than same, and what was the lesser diameter of the core as expanded coincides with the greater transverse diameter of said sheathing and is less than same, thus providing the required clearance; and then withdrawing the core.

50. In the art of molding concrete piles in the earth, the method of preparing the earth-mold, which consists in driving a preparatory pile-core provided with a transversely yielding sheathing or envelop, into the ground, in an expanded position; then further expanding said core so as to compress the sides of the hole through the transverse yielding movement of said sheathing or envelop, then contracting said core and withdrawing it out of said envelop.

51. The method of preparing an earth-mold for a concrete pile, which consists in placing a transversely yielding shell around an expansible and collapsible temporary pile, driving both into the ground, then expanding the core to expand said yielding shell and compress the wall of the mold, and withdrawing the temporary pile.

52. The method of making a mold for forming composite piling, consisting in placing a transversely yielding envelop around an expansible and collapsible temporary pile, driving both into the ground, then expanding said pile transversely so as to press said envelop against the sides of the hole, then collapsing and withdrawing said temporary pile, and then withdrawing the yielding envelop.

53. The method of making an earth-mold for a concrete pile, consisting in driving into the ground an expansible and collapsible temporary pile surrounded by a transversely yielding envelop, collapsing said pile and withdrawing the same, partially moving together the sides of the transversely yielding envelop, and withdrawing the same from the ground.

54. The method of making an earth-mold for a concrete pile, consisting in driving into the ground an expansible and collapsible temporary pile surrounded by a transversely yielding envelop, then transversely expanding said pile so as to press said envelop against the sides of the hole, collapsing said pile and withdrawing same, partially drawing together the sides of the transversely yielding envelop, and withdrawing the same.

55. The method of driving a transversely yielding sheathing or envelop into the ground, which consists in placing same around a collapsible core and driving both into the ground, then expanding the core to press said yielding envelop against the sides of the hole, and then collapsing the core so as to leave said sheathing in the ground with substantially the same internal diameter as the external diameter of the expanded core.

56. The method of making an earth-mold for a concrete pile, consisting in providing an expansible and collapsible temporary pile composed of a plurality of members overlapping the sides at the gaps so as to prevent the entrance of earth into said temporary pile, driving said collapsible pile in an expanded form and without an envelop into the ground, then collapsing said pile and withdrawing the same.

57. The method herein described of making an earth-mold for a concrete pile, which consists in driving a collapsible core into the ground, then expanding said core so as to compress the wall of the hole, and then collapsing said core and withdrawing same.

58. The combination in a temporary pile for making composite piling of a withdrawable point having plates overlapping the sides of the pile.

59. In a core or pile, the combination with a point therefor, comprising a plurality of movable sections, of a removable member held in place by said sections when assembled, and means for removing said member from engagement with said sections.

60. The combination in a temporary pile of a withdrawable point having a duct therein and hose attached to said duct for forcing liquid therethrough.

61. In a core or pile, the combination with a point therefor comprising a plurality of sections, of a removable member held by said sections and constructed with one or more passageways, and a conduit connected with said passageways by means of which fluid is forced or fed therethrough.

62. The combination with a core or pile composed of a plurality of sections movable in relation to each other, and means for moving said sections, of a point for said core or pile comprising a plurality of sections, and means connected to said point sections and coacting with said core sections so that said point sections will conform to the transverse movement of said core sections.

63. The combination with a core or pile composed of a plurality of sections movable in relation to each other, and means for moving said sections, of a point for said core or pile comprising a plurality of sections, means connected to said point sections and coacting with said core sections so that said point sections will conform to the transverse movement of said core sections, and means attached to said point sections and operating within said core to permit of the withdrawal of said point sections when said core is withdrawn from the ground.

64. The combination with a temporary pile or core composed of a plurality of movable outer core sections, of a hollow member surrounded by said outer sections, a point composed of a plurality of point sections, guides adapted to guide said point sections, and flexible means leading to the top of said pile adapted to draw up said point sections between the outer core sections and the hollow inner member.

65. The combination with an expansible and collapsible temporary pile, of a follower adapted to drive said pile and permit the expansion and collapsing of said temporary pile.

66. The combination with a core for making concrete piling, composed of a plurality of longitudinal sections movable in or out, of means for moving said core sections, and an extension or follower detachably secured to the upper ends of said core sections and constructed to permit of the in and out movement of same.

67. The combination with a core for making concrete piling, composed of a plurality of longitudinal sections movable in or out, of means whereby said sections are forced out so as to increase the diameter of the core and contracted so as to decrease the diameter of same, and an extension or follower detachably secured to the upper ends of said sections, and constructed to permit of the in and out movement of the same.

68. The combination with a core for making concrete piling, composed of a plurality of longitudinal sections movable in or out, of means whereby said sections are forced out so as to increase the diameter of the core, and contracted so as to decrease the diameter of same; an extension or follower comprising a lower member consisting of a plurality of sections detachably secured to the top ends of said core-sections; an upper member, and means whereby said sections of said lower member are movably connected thereto so as to permit of the movement of said core-sections.

69. The combination with a core for making concrete piling, composed of a plurality of longitudinal sections movable in or out, of means whereby said sections are forced out so as to increase the diameter of the core, and contracted so as to decrease the diameter of same; an extension or follower comprising a lower member consisting of a plurality of sections detachably secured to the top ends of said core-sections and provided on their upper edges with lugs; an upper member provided in its lower edge with recesses in which have movement the lugs for the sections of said lower member, and pins passing through said lugs whereby the sections of said lower member are connected to said upper member.

70. The method of preparing an earth-mold for a concrete pile, which consists in sinking a collapsible preparatory pile provided with a lateral sheathing, then collapsing the core and withdrawing it to expose the bottom of the hole, and finally removing the sheathing from the wall of the hole.

71. A collapsible temporary pile comprising in combination a plurality of longitudinal members, a spring plate having a tendency to bend inward longitudinally, and having edges bearing on the outside of a plurality of said longitudinal members and bridging an opening therebetween and so adapted that when said pile is collapsed the edges of said plate will bear on the outside of said members, thus excluding dirt from the interior of said pile.

72. An expansible and collapsible temporary pile comprising in combination a plurality of longitudinal members, means for expanding and collapsing said pile, a plate secured to the edge of one of said longitudinal members and lapping on the periphery of the other longitudinal member, said plate having fiber tension tending to hold the free end against the outside of its engaging member and so adapted that when the pile is collapsed, said free end of the plate will spring inward and thus always form a close joint on the longitudinal member, thus preventing dirt entering said pile.

73. An expansible temporary pile comprising a plurality of longitudinal outer members adapted to be driven in direct engagement with the earth, in combination with an inner member holding the same expanded, and a plate attached to one longitudinal member and bridging the space between two longitudinal members and having its free end bearing on the extreme outer periphery of the second longitudinal member to prevent the entrance of dirt during driving.

74. A preparatory pile comprising a point, a driving head, and a casing, adapted to receive and mold composite material and divided longitudinally into separable sections interposed between the point and the driving head and detachably connected with the point.

75. A preparatory pile comprising a casing adapted to receive and mold composite material, and made in longitudinally divided detachable sections, capable of separate removal, and an earth spreading device at the lower end of this casing.

76. A preparatory pile comprising a point, a driving head, and a longitudinally divided separable casing adapted to receive and mold composite material, and interposed between the point and the driving head and detachably connected therewith.

77. A preparatory pile comprising a point and a casing, adapted to receive and mold composite material, and divided longitudinally into separable sections and detachably connected with the point.

78. A preparatory pile comprising a point, a driving member resting on the point adapted to transmit the driving blows to said point and thereby force same into the ground, a driving head resting on said driving member, and a longitudinally divided separable casing surrounding said driving member and extending from the driving head to the point.

79. A preparatory pile which comprises a member consisting of vertical sections, and means, operatively independent of any means causing vertical movement of said member, for transversely moving said sections.

80. A preparatory pile, which comprises a hollow member consisting of vertical wall sections, and means operating inside said member, and operatively independent of any means causing vertical movement of said member, to transversely move said wall sections.

81. A preparatory pile which comprises a member consisting of vertical sections, means for expanding said sectional member and for locking it in its expanded position. and means, operatively independent of any means causing vertical movement of said member, to collapse said sections.

82. A preparatory pile which comprises a member consisting of vertical sections, means for expanding said sectional member and for locking it in its expanded position, and auxiliary means for expanding said member beyond its position when locked.

83. The combination with an expansible and contractible preparatory pile adapted to be sunk to form a hole and to be withdrawn therefrom, of means operative independently of any means causing vertical movement of the pile, to positively expand and contract it.

84. The combination with an expansible and contractible preparatory pile adapted to be sunk to form a hole and to be withdrawn therefrom, of means operative independently of any means causing vertical movement of the pile, to positively expand it, and separate means for positively contracting it.

85. The combination with an expansible and contractible preparatory pile adapted to be sunk to form a hole and to be withdrawn therefrom, of means operative independently of any means causing vertical movement of the pile, to positively contract it, and separate means for positively expanding it.

86. The combination with an expansible and contractible preparatory pile adapted to be sunk to form a hole and to be withdrawn therefrom, of separate means adapted respectively to expand and to contract said pile, each of said means being adapted to operate independently of any means causing vertical movement of the pile.

87. In the art of placing piles in the earth, the method of forming a hole in the earth for the reception of the pile, which consists in sinking in direct engagement with the earth, a vertically-sectioned preparatory pile; then, after sinking and before commencing withdrawal of the preparatory pile, moving its sections to reduce its subsequent withdrawal-friction with the earth-wall of the hole; and withdrawing the preparatory pile.

88. The combination with a contractible preparatory pile adapted to be sunk in direct engagement with the earth, of means for contracting the pile, after sinking and before commencing its withdrawal, to permit its withdrawal from the hole with less friction with the earth-wall.

89. In the art of placing piles in the earth, the method of forming a hole in the earth for the reception of the pile, which consists in sinking in direct engagement with the earth, a vertically-sectioned preparatory pile; then, after sinking and before commencing withdrawal of the preparatory pile, compressing the earth-wall of the hole by moving the sections of the preparatory pile; then, before commencing withdrawal of the preparatory pile, moving its sections to reduce its subsequent withdrawal-friction with the earth-wall of the hole; and withdrawing the preparatory pile.

90. The combination with an expansible and contractible preparatory pile adapted to be sunk in direct engagement with the earth, of means for expanding said pile, after sinking and before commencing its withdrawal, to compress the earth-wall of the hole, and means for thereafter contracting the pile to permit its withdrawal from the hole with less friction with the earth-wall.

91. In the art of placing piles in the earth, the method which consists in sinking in direct engagement with the earth, a vertically-sectioned preparatory pile having a substantially hollow center and a suitable point, then, after sinking and before commencing withdrawal of the preparatory pile, moving its sections to reduce its subsequent withdrawal-friction with the earth-wall of the hole; placing the permanent pile through the central hollow of the preparatory pile and down in the hole; and withdrawing the preparatory pile.

92. The combination with a contractible preparatory pile adapted to be sunk in direct engagement with the earth, of means for contracting the pile, after sinking and before commencing its withdrawal, to permit its withdrawal from the hole with less friction with the earth-wall; said pile having a substantially hollow center adapted to permit the passage of the permanent pile through it.

93. In the art of placing piles in the earth, the method which consists in sinking in direct engagement with the earth, a vertically-sectioned preparatory pile having a substantially hollow center and a suitable point, then, after sinking and before commencing withdrawal of the preparatory pile, compressing the earth-wall of the hole by moving the sections of the preparatory pile;

then, before commencing withdrawal of the preparatory pile, moving its sections to reduce its subsequent withdrawal-friction with the earth-wall of the hole; placing the permanent pile through the hollow center of the preparatory pile and down in the hole; and withdrawing the preparatory pile.

94. The combination with an expansible and contractible preparatory pile adapted to be sunk in direct engagement with the earth, of means for expanding said pile, after sinking and before commencing its withdrawal, to compress the earth-wall of the hole, and for thereafter contracting the pile to permit its withdrawal from the hole with less friction with the earth-wall; said pile having a substantially hollow center adapted to permit the passage of the permanent pile through it.

95. In the art of placing piles in the earth, the method which consists in simultaneously sinking a vertically-sectioned preparatory pile and a vertically-sectioned enveloping sheathing; then, after sinking and before commencing withdrawal, moving the sections of the preparatory pile to reduce its subsequent withdrawal-friction with the sheathing; withdrawing the preparatory pile; and contracting the sheathing to reduce its subsequent withdrawal-friction with the earth-wall of the hole and withdraw it from the hole.

96. The combination with a contractible preparatory pile and a contractible enveloping sheathing, of means for contracting said pile, after sinking and before commencing its withdrawal, to permit its withdrawal with less friction with the contractible enveloping sheathing.

97. In the art of placing piles in the earth, the method of forming a hole in the earth for the reception of the pile, which consists in sinking a vertically-sectioned preparatory pile and a vertically-sectioned enveloping sheathing; then, after sinking and before commencing withdrawal, compressing the earth-wall of the hole by moving the sections of the preparatory pile to force outwardly the sections of the sheathing; then, before commencing withdrawal of the preparatory pile, moving its sections to reduce its subsequent withdrawal-friction with the sheathing; withdrawing the preparatory pile; and contracting the sheathing to reduce its friction with the earth-wall of the hole and withdraw it from the hole.

98. The combination with an expansible and contractible preparatory pile, of an expansible and cantractible enveloping sheathing, means for expanding said pile, after driving, to expand the sheathing and compress the earth-wall of the hole, and for thereafter contracting said pile, before commencing its withdrawal, to permit its withdrawal with less friction with the contractible enveloping sheathing.

99. In the art of placing piles in the earth, the method which consists in simultaneously sinking a vertically-sectioned preparatory pile and a vertically-sectioned bottomless sheathing; then, after sinking and before commencing withdrawal, moving the sections of the preparatory pile to reduce its subsequent withdrawal-friction with the sheathing; withdrawing the preparatory pile; placing the permanent pile through the bottomless sheathing and down into the hole; and contracting the sheathing to reduce its subsequent withdrawal-friction with the earth-wall of the hole and withdraw it from the hole.

100. The combination with a contractible preparatory pile and a contractible bottomless enveloping sheathing adapted to permit the passage through it of the permanent pile, of means for contracting the preparatory pile, after sinking and before commencing to withdraw it, to permit its withdrawal with less friction with the contractible sheathing.

101. In the art of placing piles in the earth, the method which consists in simultaneously sinking a vertically-sectioned preparatory pile and a vertically-sectioned bottomless sheathing; then, after sinking and before commencing withdrawal, compressing the earth-wall of the hole by moving the sections of the preparatory pile to force outwardly the sections of the sheathing; then, before commencing withdrawal of the preparatory pile, moving its sections to reduce its subsequent withdrawal-friction with the sheathing; withdrawing the preparatory pile; placing the permanent pile through the bottomless sheathing and down into the hole; and contracting the sheathing to reduce its withdrawal-friction with the earth-wall of the hole and withdraw it from the hole.

102. The combination with an expansible and contractible preparatory pile, and a bottomless expansible and contractible sheathing adapted to permit the passage through it of the permanent pile, of means for expanding said pile, after driving, to expand the sheathing and compress the earth-wall of the hole, and for thereafter contracting said pile, before commencing its withdrawal, to permit its withdrawal with less friction with the contractible enveloping sheathing.

103. In the art of placing piles in the earth, the method of forming a hole in the earth for the reception of the pile, which consists in simultaneously sinking a preparatory pile and a vertically-sectioned enveloping sheathing; then withdrawing the preparatory pile; and then moving the sections of the sheathing to reduce its withdrawal-friction with the earth-wall of the hole and withdraw it from the hole.

104. The combination with a preparatory pile and a suitable earth-penetrating point, a sheathing laterally surrounding the pile, said pile and point being withdrawable up through the sheathing, and said sheathing being transversely contractible to permit its withdrawal with less friction with the earth-wall of the hole.

105. In the art of placing piles in the earth, the method which consists in simultaneously sinking a vertically-sectioned preparatory pile and a bottomless enveloping sheathing; then, after sinking and before commencing withdrawal, moving the sections of the preparatory pile to reduce its subsequent withdrawal friction with the sheathing; withdrawing the preparatory pile to expose the bottom of the hole; placing the permanent pile through the bottomless sheathing and down into the hole; and withdrawing the sheathing.

106. The combination with a transversely contractible preparatory pile, of a sheathing therefor formed with a bottom opening to permit the passage therethrough of the preparatory pile and the permanent pile, and means for contracting the preparatory pile, after sinking and before commencing withdrawal, to permit its withdrawal with less friction with the sheathing.

107. In the art of placing concrete piles in the earth, the method which consists in simultaneously sinking a preparatory pile, an earth penetrating point, and a substantially hollow bottomless sheathing down through which said point operatively projects; then withdrawing the point and preparatory pile to expose the bottom of the earth-hole, temporarily leaving the bottomless sheathing to support the earth-wall of the hole; placing the permanent pile through the bottomless sheathing and down into the hole, and withdrawing the sheathing.

108. The combination with a preparatory pile for forming earth-holes for piles, and having an earth-penetrating point, of a sheathing enveloping the preparatory pile, and adapted to be sunk simultaneously therewith and with said point, and being open at the bottom to permit the operative projection into the earth of the point, said pile and point being adapted to be removed from the sheathing to expose the bottom of the hole, and said sheathing being adapted to be temporarily left in the hole to support the earth-wall thereof after the removal of the preparatory pile, said sheathing being also substantially hollow to permit the passage through itself of the permanent pile; and said sheathing being also adapted to be removed from the hole when its function of supporting the earth-wall is assumed by the permanent pile.

109. Means for placing in the earth, solid piles composed of concrete from center to earth-wall, which comprises a preparatory pile and an earth penetrating point, and a sheathing around the preparatory pile above the point, said sheathing being hollow and having a bottom opening to permit the preparatory pile to operate through said opening to sink the point, and said sheathing being adapted to be sunk simultaneously with the preparatory pile and point; the structure being adapted to provide clearance between the preparatory pile and the sheathing, to permit the ready withdrawal of the preparatory pile from the sheathing without withdrawing the sheathing, said clearance extending substantially from end to end of the sheathing.

110. Means for placing in the earth, solid piles composed of concrete from center to earth-wall, which comprises a preparatory pile and an earth penetrating point, and a sheathing around the preparatory pile above the point, said sheathing being hollow and composed of separate sections and having a bottom opening to permit the preparatory pile to operate through said opening to sink the point, and said sectional sheathing being adapted to be sunk simultaneously with the preparatory pile and point; the structure being adapted to provide clearance between the preparatory pile and the sectional sheathing, to permit the ready withdrawal of the preparatory pile from the sectional sheathing without withdrawing the sectional sheathing, said clearance extending substantially from end to end of the sectional sheathing.

111. Apparatus for placing concrete piles in the earth, which comprises a driving-member, a suitable earth-penetrating point, and a hollow sheathing around the driving-member, the sheathing having an open bottom through which the driving member and point can coöperate; said parts being relatively constructed and arranged to cause the driving member, exclusive of the sheathing, to receive the driving blows which are transmitted to the point; and to cause the sheathing to descend with the driving member and point into the hole formed by them, and to permit the driving member to be withdrawn from the sheathing to leave the latter to support the earth-wall of the hole.

112. In an apparatus for molding concrete piles, the combination with an earth-penetrating member; of a member constructed separately from but to serve to sink said earth-penetrating member; and a tube surrounding the sinking member and serving to support the wall of the hole formed by the earth-penetrating and sinking members, said tube being formed with an open bottom, to permit the coöperation through itself of said hole-forming members; said sinking member being constructed to provide a withdrawal clearance between itself and said tube and to be withdrawn therefrom, said tube being adapted to receive the concrete for the permanent pile.

113. In an apparatus for molding concrete piles, the combination with an earth-penetrating member; of a driving member therefor constructed separately therefrom; and a tube surrounding the driving member and serving to support the wall of the hole formed by the driving and earth-penetrating members; said tube being formed with an open bottom, to permit the coöperation through itself of said hole-forming members; said driving member and tube being constructed to cause the driving-member, exclusive of the tube, to receive the driving blows which are transmitted to the earth-penetrating member, and being constructed also to provide a withdrawal clearance between them; said tube being adapted to receive the concrete for the permanent pile.

114. A preparatory pile having an earth-penetrating member, said pile being constructed in vertical sections to be transversely expansible and contractible, the sections thereof being constructed to form a substantially hollow center, and the pile and earth-penetrating member being constructed to permit the passage of the permanent pile through the hollow center of the preparatory pile and to permit the withdrawal of the preparatory pile.

115. A preparatory pile having an earth-penetrating member, said pile being constructed in vertical sections to be transversely expansible and contractible, the sections thereof being constructed to form a substantially hollow center, and the pile and earth-penetrating member being constructed to permit the passage of the permanent pile through the hollow center of the preparatory pile and to permit the withdrawal of the preparatory pile and the earth-penetrating member.

116. A preparatory pile having an earth-penetrating member, both constructed in vertical sections, in combination with means operative inside the pile to prevent transverse movement of said sections during the sinking of said members.

117. A preparatory pile having an earth-penetrating member, said pile being constructed in vertical sections to be transversely expansible and contractible, the sections being constructed to form a substantially hollow center, and to prevent the occurrence of openings between the sections when the pile is expanded; in combination with means operative inside the pile to prevent the transverse movement of the pile-sections during the sinking of the pile; the pile and earth-penetrating member being constructed to permit the passage of the permanent pile through the hollow center of the preparatory pile and to permit the withdrawal of the preparatory pile.

118. A preparatory pile which comprises two hollow expansible and contractible pile-members arranged one within the other.

119. The method of molding concrete piles which consists in sinking an earth-penetrating member by means of an attached tubular operating member, and simultaneously sinking a tube surrounding said tubular member and serving to support the earth-wall; withdrawing the operating member and earth-penetrating member; and emplacing the concrete and withdrawing the earth-supporting tube.

120. A preparatory pile having a casing and an earth-penetrating member, each constructed in separable vertical sections capable of independent withdrawal.

121. In the art of molding concrete piles in the earth, the method which consists in simultaneously sinking a hollow contractible hole-forming member, a detachable bottom plate, and a sheathing or casing around the hole forming member; supplying concrete down through the hollow hole-forming member into the casing, and collapsing and withdrawing the hole-forming member, the hollow casing being adapted to receive the concrete; and withdrawing the casing.

122. In the art of molding concrete piles in the earth, the method which consists in sinking a hollow contractible hole-forming member and a detachable bottom plate, supplying concrete down through the hollow member, and collapsing and withdrawing said hollow member.

123. As an element of a preparatory pile, an expansible and contractible core-sheathing or casing substantially as and for the purpose disclosed.

124. A preparatory pile, which comprises a driving-core and a transversely yielding sheathing or casing surrounding the driving-core.

125. Apparatus for molding concrete piles in the earth, which comprises a hole-forming member having a suitable earth-penetrating portion and a sheet metal sheathing laterally surrounding the hole-forming member and held against the same by inward earth-pressure in the hole, said hole-forming member being constructed to be contractible and to be withdrawable from the sheathing; and means for effecting such contraction and operable independently of and prior to the commencement of the withdrawal.

126. Apparatus for molding concrete piles in the earth, which comprises a hole-forming member having a suitable earth-penetrating portion and a sheet metal sheathing laterally surrounding the hole-forming member, and the hole-wall against inward earth-pressure, said hole-forming member being constructed to be contractible and to be withdrawable from the sheathing; and said lateral sheathing being constructed in vertical sections to permit its withdrawal from the hole.

127. Apparatus for molding concrete piles in the earth, which comprises a hole-forming member having a suitable earth-penetrating portion and a sheet metal sheathing laterally surrounding the hole-forming member and supported thereby against inward earth-pressure in the operation of sinking, said hole-forming member being constructed to be contractible and to be withdrawable from the sheathing; said lateral sheathing being constructed in separately withdrawable vertical sections, and said hole-forming member being formed hollow to permit the introduction of concrete through it to the interior of the sheathing prior to the withdrawal of the hole-forming member.

128. Apparatus for molding concrete piles in the earth, which comprises a hole-forming member having a suitable earth-penetrating portion both constructed to be collapsible to be readily withdrawable from the hole; said hole-forming member being constructed to be expanded after being sunk; in combination with means operable to collapse said members prior to the commencement of their withdrawal.

129. Apparatus for molding concrete piles in the earth, which comprises a hole-forming member having a suitable earth-penetrating portion both constructed to be collapsible to be readily withdrawable from the hole; said members being formed hollow to permit the introduction of concrete into the hole prior to their withdrawal therefrom.

130. Apparatus for molding concrete piles in the earth, which comprises a hole-forming member and a separable earth-penetrating member, the hole-forming member being constructed to be expanded after sinking, and thereafter to be contracted to be withdrawable from the hole.

131. Apparatus for molding concrete piles in the earth, which comprises a hole-forming member and a separable earth-penetrating member, the hole-forming member being formed hollow to permit the introduction of concrete through it and being constructed to be collapsible after sinking, to be readily withdrawable from the hole.

132. Apparatus for molding concrete piles in the earth, comprising a core, a sheath and a separable point, the core being constructed to be contractible after driving, to be withdrawable from the sheath; in combination with means for effecting such contraction independently of and prior to the commencement of the withdrawal of the core.

133. Apparatus for molding concrete piles in the earth, comprising a core, a sheath and a separate point, the core being constructed to be contractible after driving, to be withdrawable from the sheath; and the sheath being constructed in vertical sections to permit its withdrawal from the hole.

134. Apparatus for molding concrete piles in the earth, comprising a core, a sheath and a separable point, the core and point each being formed hollow and constructed to be contracted after driving.

135. Apparatus for molding concrete piles in the earth, which comprises a hole-forming member having a suitable earth-penetrating portion and a sheet metal sheathing laterally surrounding the hole-forming member and supported thereby against inward earth-pressure in the operation of sinking, said hole-forming member being constructed hollow and contractible, to permit the introduction of concrete through it to the interior of the sheathing prior to the withdrawal of the hole-forming member, and to permit the withdrawal of the hole-forming member from the sheathing.

In testimony whereof I have signed my name to this specification, in the presence of two subscribing witnesses.

JOHN FREDERICK DOUGLAS WITHROW.

Witnesses:
  EDWARD MARRIOTT,
  R. S. LODE.